United States Patent [19]

Moon

[11] 4,250,579
[45] Feb. 17, 1981

[54] WATER SAVING PANEL DEVICE FOR WATER CLOSETS AND METHOD
[75] Inventor: Jacob R. Moon, Hillsborough, N.C.
[73] Assignee: Moon Water Saver, Inc., Hillsborough, N.C.
[21] Appl. No.: 910,787
[22] Filed: May 30, 1978

Related U.S. Application Data

[60] Continuation of Ser. No. 734,643, Oct. 21, 1976, abandoned, which is a division of Ser. No. 245,531, Apr. 19, 1972, Pat. No. 4,009,497.

[51] Int. Cl.³ ................................................ E03D 1/00
[52] U.S. Cl. ............................................ 4/415; 4/364
[58] Field of Search ............................................ 4/415, 1

[56] References Cited
U.S. PATENT DOCUMENTS

| 320,625 | 6/1885 | Carney | 4/415 |
| 413,586 | 10/1889 | Wellington | 4/415 |
| 1,323,703 | 12/1919 | Linfoot | 4/415 |

FOREIGN PATENT DOCUMENTS 297  6/1913 United Kingdom ........................ 4/415

Primary Examiner—Henry K. Artis
Attorney, Agent, or Firm—B. B. Olive

[57] ABSTRACT

A pair of flexible or extensible panel members are adapted for vertical placement in the base of a conventional water closet flush tank in spaced relationship about the outlet valve such that edge portions of the panel members are in sealing contact with corresponding portions of the bottom and side walls of the tank, thereby forming an open-ended vertical column. During toilet bowl evacuation, savings of water normally consumed are realized as water stored in the tank and peripheral to the column is prevented from exiting the tank.

2 Claims, 7 Drawing Figures

U.S. Patent
Feb. 17, 1981
4,250,579
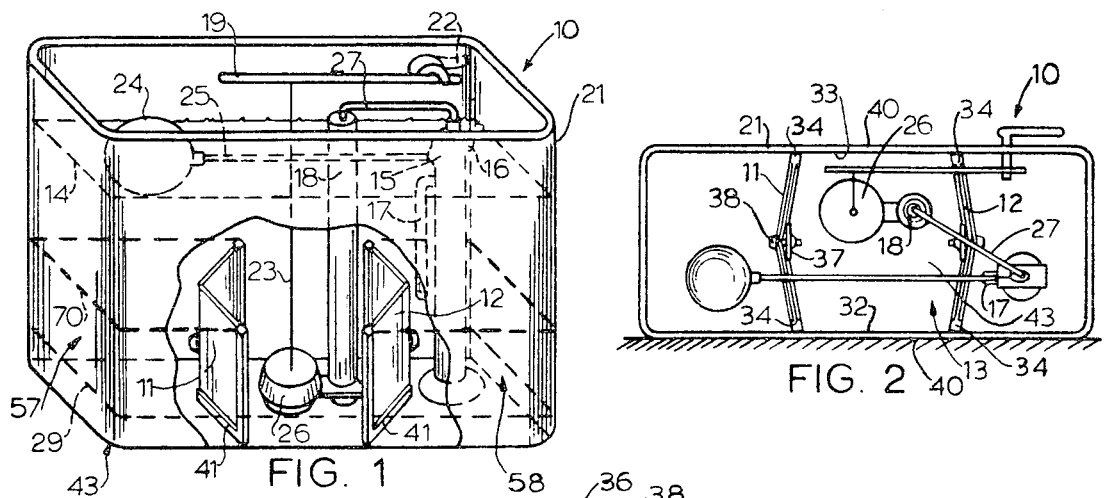
FIG. 1
FIG. 2
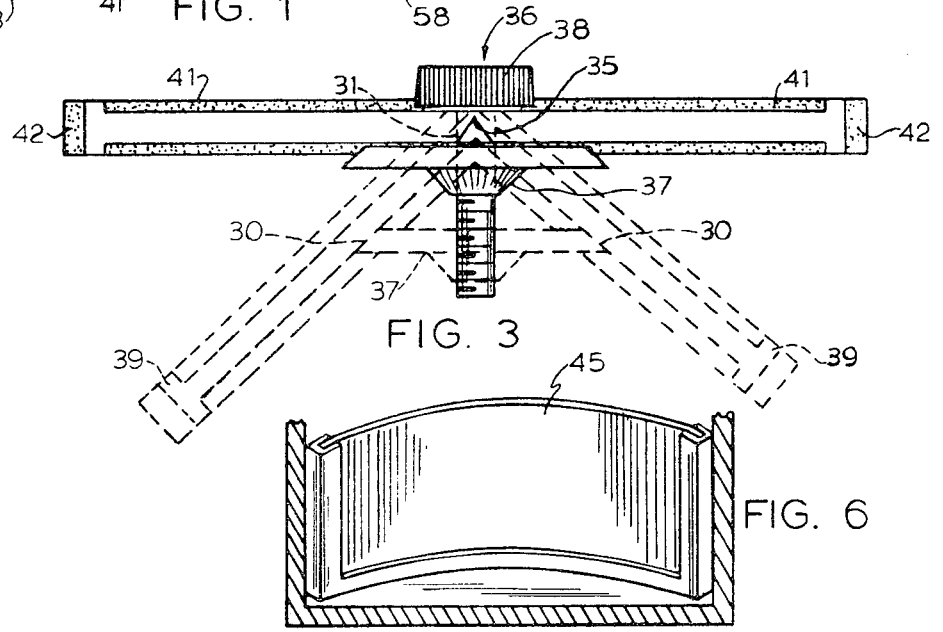
FIG. 3
FIG. 6
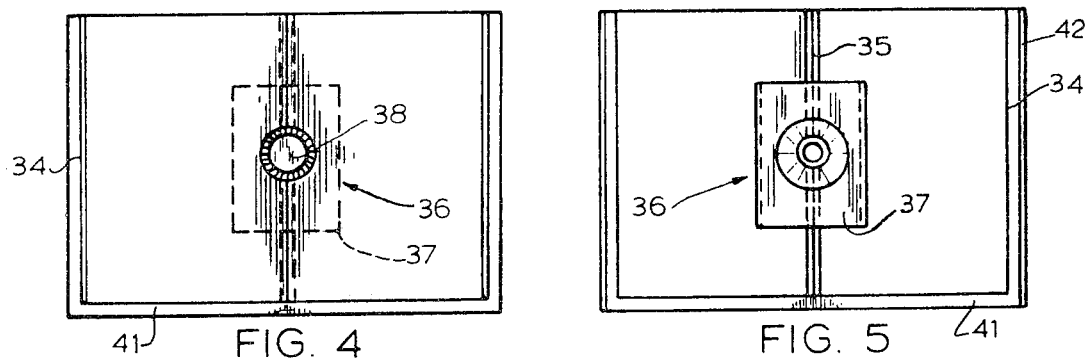
FIG. 4
FIG. 5
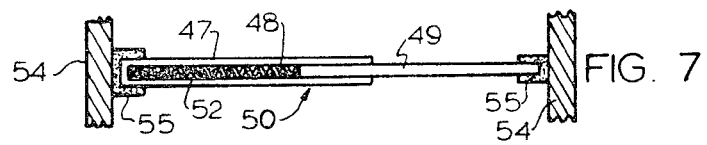
FIG. 7

WATER SAVING PANEL DEVICE FOR WATER CLOSETS AND METHOD

This is a continuation of application Ser. No. 734,643 filed Oct. 21, 1976, now abandoned; which is a division of application Ser. No. 245,531, filed Apr. 19, 1972, now U.S. Pat. No. 4,009,497.

CROSS-REFERENCE TO RELATED APPLICATIONS

This application relates to and constitutes an improvement over copending applications, Ser. No. 105,032, entitled "Water Saving Apparatus and Method for Water Closets," and Ser. No. 191,228, entitled "Auxiliary Water Saving Attachment for Water Closets and Method".

BACKGROUND OF THE INVENTION

1. Field of the Invention:

The invention relates to water closets of the type having a flush tank and outlet valve assembly, and particularly to devices adapted for placement in water closet flush tanks to effect savings of water during flushing.

2. Description of the Prior Art:

A common type of water closet which has widespread household, hotel, motel, and institutional use, employs a rectangular flush tank in which a valve mechanism is mounted. Recognizing that a surplus of water is often expended during the flushing operation of a conventional water closet employing such a flush tank, the prior art has sought various means with which to effect savings of water normally consumed. One well-known approach has been to provide the user with a choice of two volumes of water depending on the matter to be flushed and is known as the dual flush type. This is shown typically in U.S. Pat. No. 3,538,519 which includes mechanical flush volume controls and refers to earlier related art.

Another broad approach, and that which is pursued by the present invention, is that of installing an auxiliary wall structure in the tank which is adapted to form an open-ended column around the valve so that water surrounding the column is prevented from being flushed and is saved in each flushing operation. This broad concept apparently first appeared in 1919 in U.S. Pat. No. 1,323,703. A modification of the same broad concept appears in U.S. Pat. No. 3,041,630 which is directed to an auxiliary structure having an adjustable column height.

The most recently discovered patent involving the same broad concept is U.S. Pat. No. 3,259,918, which provides a rigid, closed wall member that forms an open-ended rectangular box which surrounds all of the internal tank mechanism including the inlet and outlet valve assemblies, and which is adhesively secured to the bottom wall to form a water column designed to save the amount of water, during each flush, which surrounds the column.

Directed to the same broad concept is copending application Ser. No. 105,032 which teaches the use of a flexible four-walled box structure having open ends and which can be bent, assembled and installed in a closet water tank without removing or altering any internal plumbing parts, to provide an open-ended column immediately surrounding the flush valve mechanism. Copending application, Ser. No. 191,228, teaches the use of a flexible, five-walled, U-shaped device which is sealed against the tank bottom and immediately surrounds the flush valve mechanism and is held in place by spring plunger rods pressing against a side of the tank. This type of construction adapts to a wider variety of existing flush tank configurations than had formerly been possible. All of the mentioned copending applications are directed to the concept of saving water during flushing by means of an inexpensive, flexible-walled auxiliary column which immediately surrounds a flush valve in a water closet flush tank. During bowl evacuation, only the water contained above the column or within the column is permitted to be discharged. The water lying outside and below the top of the column is retained. Although the devices and methods of the aforementioned copending applications are believed to be unique and to have been the first teaching of a convenient, inexpensive and effective means of saving water during flushing without requiring disassembly of the tank plumbing, a need for further improvement has been revealed.

While the previously mentioned copending applications have been concerned with inventions having proven success in a majority of plumbing installations, it is recognized that there still exists a small yet significant number of water closet flush tanks wherein the above mentioned inventions may not prove entirely satisfactory without small modification to the invention apparatus. In particular, unconventional placement of plumbing parts within the flush tank often prohibits the use of water saving devices of the prior art. It is therefore an object of the present invention to provide an inexpensive, easily installed, efficient water saving device adapted for use in nearly all types of water closet flush tanks. In addition, due to the wide range in flush tank configurations, water saving devices of the prior art and as described in the previously mentioned copending applications, often require minor adjustment and modification to yield the optimum flow and volume characteristics. Frequently this entails alterations not consistent with the original design and function. It is therefore another object of the present invention to provide a water saving device suitable for use in water closet flush tanks, which can be readily adjusted while in the tank to give the desired flushing characteristics.

Other objects and advantages of the present invention will be perceived in the description and appended claims which follow.

SUMMARY OF THE INVENTION

In a preferred embodiment the apparatus of the present invention comprises a pair of flexible panels each having a generally rectangular shape and a transverse fold line adapted to form a V-shaped structure and which are adapted, upon being compressed along their respective lengths, for vertical placement in spaced relationship about the outlet valve in the base of a conventional water closet flush tank such that the panels extend upwardly only a portion of the height of the tank. Selected edge portions of the panels are adapted to sealingly engage portions of the tank side and bottom walls when the panels are no longer compressed and are free to press outwardly against the tank sides, thus forming an open-ended water column around the outlet valve. According to the invention, when the tank is flushed by opening the outlet valve, the water level drops essentially to the level of the top of the column, while water within the column is rapidly drained.

Water surrounding the column below its topmost edge is prevented from exiting the tank and is thereby saved. The panels are spaced apart as desired to save comparatively larger or smaller amounts of water.

DESCRIPTION OF THE DRAWINGS

FIG. 1 is a perspective view of a conventional flush tank with a portion of the tank cut away with the plumbing parts simplified for purpose of illustration and with an apparatus made according to the invention installed therein.

FIG. 2 is a top plan view showing the matching wall structures in position.

FIG. 3 is a top view of a wall structure showing the location of edge sealing strips and tension adjustment screw.

FIG. 4 is a front elevation view of the wall structure of the invention.

FIG. 5 is a rear elevation view of the wall structure of the invention.

FIG. 6 is a perspective cutaway view of an alternate wall structure showing the relative position of side and bottom walls of a conventional flush tank.

FIG. 7 is a top view of an alternate extensible wall structure utilizing integral spring means to apply lateral pressure against the side walls shown in cutaway view.

DESCRIPTION OF THE PREFERRED EMBODIMENT

Referring now to FIG. 1, the apparatus of the invention, generally designated 10, comprises a pair of matching flexible panel members 11, 12 which are shown situated inside a conventional flush tank 21. The flushing mechanism typically consists of an inlet tube 15, inlet valve 16, filler tube 17, overflow tube 18, outlet valve 26, trip arm 19, trip handle 22, trip linkage wire 23, ball float 24, ball float arm 25, and refill tube 27. Without installation of a water saving apparatus flushing normally proceeds as trip arm 19 is activated by depressing handle 22 causing trip linkage wire 23 to open valve 26, permitting stored water in tank 21 to flow into the toilet bowl (not shown) to effect evacuation. Once the water has reached the minimum level indicated by dashed lines 29, valve 26 closes. Inlet valve 16, having been opened when float 24 began to fall with the exiting water, allows incoming water to refill tank 21 through filler tube 17 and refill the toilet bowl through refill tube 27. Once the water reaches the maximum level 14, ball float 24 is high enough to cause inlet valve 16 to close readying the toilet for the next use.

In a preferred embodiment shown in FIGS. 1, 2, 3, 4 and 5, the apparatus of the invention is composed of a pair of matching flexible panel members 11, 12 adapted for vertical placement in a water tank of the class described, and in spaced relationship about the outlet valve 26 and associated overflow tube 18. Referring to FIG. 3, each of said panels is adapted by a central vertical score line 35 to be compressed into a V-shape as shown, prior to insertion into the flush tank. Stiffening means 36, best shown in FIGS. 3, 4 and 5, includes a suitable plate wing nut 37 and a bolt 38 which passes through a hole 31 in the center of score line 35 and is adapted to urge said V-shaped panel back into a planar configuration upon tightening of wing nut 37. The plate wing nut 37 includes beveled edges 30 which are adapted to engage portions of the flexible V-shaped panel member to thereby create sufficient leverage to exert pressure outwardly. In so doing, the respective selected edge portions 34 of panel members 11, 12 are urged toward the adjacent tank side walls 40. Edge seal strips 42 are secured to said selected edge portions 34 and are adapted to sealably engage panels 11, 12 against the tank side walls 40 when sufficient outward pressure is exerted thereby forming a water column 13 having a top open end, situated peripheral to said outlet valve assembly and bounded by panel members 11, 12 and portions 32, 33 therebetween of said tank side walls 40. A similar edge seal strip 41 is secured to the bottom edge portion of each panel member 11, 12 and is adapted to sealably engage panel members 11, 12 against the tank bottom wall 45 prior to tightening of stiffening means 36 and the corresponding exertion of outward pressure, rendering the base and sides of said water column 13 watertight. Edge seal strips 41, 42 may suitably be a unitary strip of rubber, vinyl, or similar resilient material, adhesively or otherwise secured in a U-shape along side and bottom edge portions of said panels as shown. Of particular importance is that the invention apparatus is adapted through the use of the described folding wall means, for easy installation around crowded existing plumbing parts without the use of hand tools, and without necessitating alteration or removal of any of the internal plumbing mechanism. Since valve mechanism design and placement often varies between different manufacturers, panel members 11, 12, during installation, may be spaced apart accordingly so as not to interfere with operating plumbing parts while performing the water saving function. A further advantage of the apparatus of the preferred embodiment folding wall configuration is that a wide range of materials having different degrees of flexibility, may be used to construct the invention. As a still further advantage of the present invention, it is recognized that the apparatus, once assembled and installed in the flush tank, requires no additional anchoring devices or adhesives as have previous auxiliary water saving devices, due to the tightness of the seals afforded by the outward pressure exerted by the V-shaped panel against the tank sides.

In an alternate embodiment shown in FIG. 6, the apparatus of the invention, typical panel member 45, is depicted without a vertical score line and without a mechanical stiffening means. It is contemplated that if a material having suitable flexibility for easy installation yet enough stiffness to maintain adequate edge seals 46 is employed, provision for folding and manual tension adjustment of the wall is no longer necessary.

In another embodiment of the invention shown in FIG. 7, each panel member 50 is adapted to include a first outer wall portion 47 having a cavity 48 therein which slidably receives a second inner wall portion 49. Spring means 52 residing inside the cavity is adapted to exert sufficient pressure outwardly to seal the respective portions 47, 49 against the tank side walls 54. Edge seal strips 55 are again adapted to sealably engage panel edge portions against tank side wall portions. While not shown, other edge strips may be employed on the bottom edges of the respective portions 47, 49. Installation proceeds as wall portions 47, 49 are compressed together and inserted into position in the water tank. The compressed walls are then released in order to hold each panel member in place. Similar to the preferred embodiment invention apparatus, a wide range of materials may be used including plastics, fiber glass, metals, etc. because the invention, in connection with the flexible folding means previously described, does not depend upon the innate flexibility of the material utilized in fabrication except in the first alternate embodiment previously described. Thus the invention has the added advantage of incorporating design and operational features which lend themselves to an extremely wide range of construction materials.

Operation of the flush tank in accordance with the objectives of the invention apparatus proceeds as follows. Referring again to FIG. 1, the apparatus of the preferred embodiment 10 is installed in a conventional water closet flush tank as previously described. Once installed, the water saving apparatus effectively divides the volume of water beneath surface level 14 into two volumetric portions. One portion consists of the water inside the artificial column 13 and also includes the water in the tank which is stored above the level represented by dashed lines 70, which is also the height of the artificial column, thus insuring utilization of the normal full flush water head and maintenance of normal flush water flow qualities. The other portion comprises the water confined below level 70 in the two areas 57, 58 peripheral to column 13. During flushing the water within column 13 descends by siphonic action at a faster rate than water above and outside the column until valve 26 closes and refilling is begun. Since water being stored outside column 13 and below level 70 is effectively prevented from passing through valve 26, it is saved in the tank. This represents a net savings of approximately 30% to 50%, depending on the particular tank construction, of the volume of water normally consumed during flushing. In addition, since the column 13 is arranged about the outlet valve mechanism 26, a Venturi effect is maintained to adequately agitate and wash the toilet bowl sides by accelerating the downward flow of the reduced volume of water. The invention apparatus therefore achieves an even further object of being an efficient means of effecting normal toilet bowl evacuation with a minimum amount of water.

From the foregoing, it is evident that the apparatus and method of the present invention provides an extremely simple and effective means to save substantial amounts of water while effecting normal flushing operations. It has the added advantage of lending itself to a wide variety of construction materials. It has a further advantage of lending itself to installation in a great variety of water closets without requiring additional modification and at absolutely nominal expense compared to the cost of water saved. That is, it has been discovered possible to utilize a pair of panel members which incorporate self-securing features, eliminating the need for additional anchoring devices and adhesive means, and which adapt the invention to installation in any of a great variety of toilet flush tanks having different types of internal plumbing arrangements. In addition, installation proceeds rapidly and simply without the use of tools, since the panel members may be flexed as required and worked around the existing tank mechanism without having to remove or alter the same. Final securement of the apparatus in the preferred embodiment is simply a matter of adjusting a wing nut and in the alternate embodiments involves either compressing and relaxing the mating walls or in the alternate embodiment of bending and allowing to unbend the flexible wall. All of the described embodiments, however, provide a pair of matching rectangular panels each having a length greater than the width between the tank side walls which allows the panels to be compressed and a height less than the tank water storage height is employed in all embodiments.

What is claimed is:

1. The method of forming a water column around the outlet valve in a water closet of a toilet flush tank of the single flush type having internal side and bottom wall surfaces and in which an outlet valve is located intermediate the length of said bottom wall and having associated plumbing mechanism for operating said valve as the exclusive control for flushing water from said tank comprising: compressing a compressible rectangular panel member, installing said compressed panel member in said tank such that said panel member is spaced from said outlet valve, and adjusting said panel member within said tank to bring the side and bottom edges thereof in relatively water-tight compressed engagement with the internal side and bottom wall surfaces of said tank to form the water column around said outlet valve such that said valve in conjunction with the location of said panel member establishes and exclusively controls the amount of water flushed from and restored to said tank on each flushing operation thereof.

2. The method of forming a water column as claimed in claim 1, including compressing and installing a second vertically positioned compressible rectangular panel member in spaced relation and opposite from the first panel member on a side opposite said outlet valve from the first panel member and adjusting said second panel member within said tank to bring the side and bottom edges thereof in relatively water-tight compressed engagement with the internal sides of bottom surfaces of said tank to form the water column with said panel members such that said valve in conjunction with the location of said panel members establishes and exclusively controls the amount of water flushed from and restored to said tank on each flushing operation thereof.

* * * * *